Dec. 3, 1968        H. I. ABBOUD        3,413,781

SONIC AEROSOL FILTERING DEVICES

Filed Aug. 15, 1966        2 Sheets-Sheet 1

United States Patent Office

3,413,781
Patented Dec. 3, 1968

3,413,781
SONIC AEROSOL FILTERING DEVICES
Harry I. Abboud, 5845 Clematis Drive,
Baton Rouge, La. 70808
Filed Aug. 15, 1966, Ser. No. 572,369
12 Claims. (Cl. 55—292)

ABSTRACT OF THE DISCLOSURE

Apparatus for separating aerosols from gases having an enclosed housing divided into a dust chamber and a clean gas discharge chamber with a plurality of filter bags positioned between the dust chamber and the clean gas discharge chamber, and a sound manifold enclosing a sound generating means which communicates with the filter bags for directing sonic waves into the bags for dislodging accumulated aerosols therefrom.

---

This invention relates to the art of removing aerosols from gases. In particular, it relates to new and improved apparatus for filtering aerosols from gases via use of sound waves.

It is well known in the art to clean dust-bearing gases, from process streams by passing the gases through fabric type filters. In a typical installation, fabric bags are disposed across the flowpath of the gas to be filtered, the gas itself penetrating and passing through the fabric while passage of the dust or solids through the pores of the fabric is prevented, at least in part, due to the smallness of the pore size. In this manner the gases passing through the fabric are cleaned.

It is the practice to provide a dual compartmented housing with an opening, or plurality of openings, e.g., between an upper and lower compartment or pair of compartments located one above the other. A tubular shaped filter bag, or bags, is disposed across the opening, or openings, between the compartments, and the bag is suspended above or below an opening. The bag itself is physically located in one compartment or the other. An open end or inlet is provided in the bag, and the opposite end of the bag is closed. The inlet end is fitted about the opening.

In certain installations, the dust laden gas is discharged directly into the opening and the solids are retained on the inside surface of the fabric bag while gas, now free of solids, passes through the bag into the next compartment. This is represented, e.g., in an installation where a bag is vertically suspended in an upper compartment and the bottom of the bag, containing the opening, is fitted over a hole or port located in a horizontally disposed partitioning wall which separates the upper and lower compartments. Or, on the other hand, a bag can be physically positioned or suspended within a lower compartment wherein aerosols, or dust-bearing gases, initially come into contact with the outside of the bag. The dust, in this instance, is retained on the outside of the bag, and the gas is passed to the inside of the bag and thereby cleaned. The clean gases ascend from inside the bag through the opening in the partition about which the bag is suspended, to enter the upper compartment. In principle, the two types of suspension are the same.

A problem in the use of all such filter installations, is that the pores of the bags quite quickly become clogged, at least partially, and further filtering action is reduced or ceases. Because of this, it is absolutely essential, and is conventional practice to periodically frequently clean the bags. As a practical matter, this is done by providing an operating cycle a sequence of which includes alternate cleaning or purging steps as well as filtering steps. The cleaning or purging action to dislodge solid particles can, e.g., be performed by mechanical agitation of the bags, reversal of the direction of gas flow, by use of sonic and ultra sonic vibrations, or by a combination of these methods.

The use of sound waves has proven a quite effective means of dislodging solid particles from filter bag surfaces, alone or in combination with other methods, and this method has found extended commercial application. Sound generating means, i.e., horns, sirens, whistles and the like, are, e.g., positioned within the upper compartment and the sonic vibrations or waves therefrom are directed into the interior of the filter bags to cause the aerosols on the fabric surface to be dislodged and separated from the bags, the dust settling under the influence of gravity.

Despite this success, however, there is a need to reduce the quantity and size of sound generators which must normally be provided in a given installation. Furthermore, the operating efficiency of the generators themselves needs to be increased especially in effecting the removal of sticky stubbornly attached dust. It is also desired in certain instances to remove the sound generating equipment from the dirty, and often highly corrosive atmosphere without substantially lessening the efficiency of the equipment. Moreover, reduction of equipment and maintenance costs is an important need.

It is accordingly the primary objective of the present invention to satisfy these and other needs. In particular, it is the object of this invention to provide new and improved means for generation of sound waves for use in cleaning aerosols in apparatus installations of the general type described. More particularly, it is an object to provide new and improved apparatus combinations.

These and other objects are accomplished in accordance with the present invention which contemplates a housing with first enclosing walls defining a dust chamber, gas inlet means to said dust chamber for admitting aerosols, a plurality of rows of first outlet openings provided in at least one of said first walls, each said outlet opening having a partitioning filter bag operatively disposed thereover thus providing a plurality of rows of bags, separated aerosol discharge means in the lower portion of said dust chamber and operatively associated therewith for removal from the dust chamber of aerosols separated from the gases, a sound manifold for each row of bags, each sound manifold being provided with second enclosing walls and defining an elongated sound chamber, sound generating means located within said sound chamber and beaming sound waves along the length of said sound chamber, second openings in at least one of said second walls forming sound wave outlets for beaming sound waves therethrough and into the filter bags, there being at least one second opening for each said first opening in a given row, each said second opening fluidly communicating with a respective one of said first openings of a given row. Preferably the end walls are of parabolic shape to best reflect sound. Within at least one end of the housing is located sound generating means, and the distance between the point source of sound produced by the generating means and the opposite closed end wall can be constructed to create a standing wave within the sound manifold, thereby further intensifying the sound waves. Preferably, the distance is a whole number multiple of the wave length of the sound produced. Some advantages can be obtained also where the distance is a one-quarter or three-quarter multiple of the wave length of the sound produced.

The sound manifold per se, with its sound generating means, can be located within a filtering installation or located outside the installation. In the former instance it is generally sufficient to provide more openings or very short projections to "conduit" sound into the inlets of the filter bags. Where the sound manifold is externally located, however, a plurality of take-off conduits or branches can be provided, these projecting from the side walls of the sound manifold and entering into a bag filter installation for communication of sound to the individual filter bags. The take-off conduits can be used to pipe sound to one or a plurality of separate installations. In such installations the location where a conduit is extended from the sound manifold, or where sound is taken off, is preferably also a distance from the point source of sound represented by a whole number multiple of the sound wave produced. In addition, the distance between the sound manifold opening from which the conduit is extended to the closed end of a filter bag could also be a whole number multiple of the sound wave produced. In other words, sound is taken off the sound manifold at a location of maximum intensity, and the location of sound take-off becomes a point source of sound for the individual conduit being used to project sound from the sound manifold.

These and other features of the invention will be better understood by reference to the following deatiled description and to the accompanying drawings to which reference is made in the description.

Referring to the figures:

FIGURE 1 depicts a side elevation view of an installation of filter bags for filtering aerosols from gases, the installations including, in particular, a sound manifold to produce intensified sound waves which are beamed directly into the upper ends of the bags for cleaning the filter bags;

FIGURE 2 is a sectional view of the embodiment of FIGURE 1; and

Figure 3:
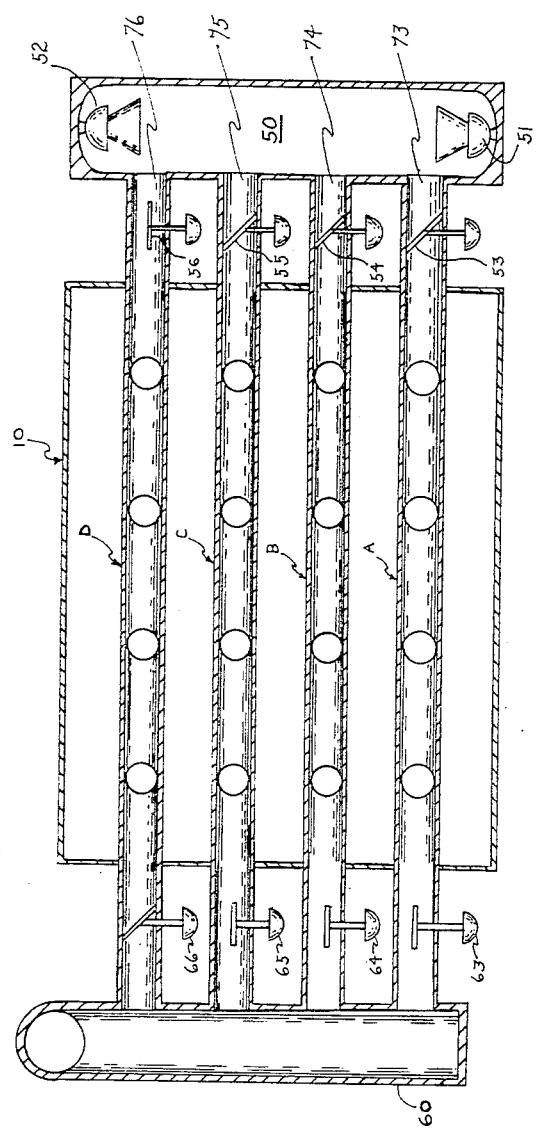
FIGURE 3 is a highly preferred embodiment which shows location of a sound manifold outside a filter bag installation, the sound being beamed therein through suitable conduits.

Referring to FIGURE 1 there is shown a housing 10 formed by enclosing vertical end walls 11, 12, top wall 13, side walls 14, 15 and converging bottom walls 16, 17. The housing 10 forms an enclosure providing a compartment 18, or dust chamber, within which is provided a plurality of filter bags 20, e.g. filter bags $20_1$, $20_2$, $20_3$ through which entering dust-laden gases must pass before egress from the chamber. On top of the enclosure is located a sound manifold 30, into which the clean gases are discharged after passage through the filter bags 20. The sound manifold 30, thus forms a clean gas compartment. Gas entering into the sound manifold is discharged via an exhaust valve 24 into an overhead clean gas manifold 25.

A sound manifold 30 is provided with a plurality of openings, $35_1$, $35_2$, $35_3$ formed by downwardly protruding tubular portions $33_1$, $33_2$, $33_3$, which are extended through openings located in top wall 13. Over the tubular portions 33 are fitted the open ends of fabric filter bags $20_1$, $20_2$, $20_3$. The bags 20 are held in place upon the tubular portions 33 by spring clamps $34_1$, $34_2$, $34_3$. The insides of the bags 20 are generally provided with wire frames, gauze, or supports (not shown) to prevent collapse of the bags during use. The bottom ends of the bags 20 are closed, generally by a solid body or end plate $22_1$, $22_2$, $22_3$ upon which the bag filters 20 are snugly fitted, as via clamps $23_1$, $23_2$, $23_3$. If desired, the bottoms of the bags 20 can be tapered inwardly, closed and provided with closed rings (not shown) for support of hooks provided with weights. The end plates 22 may be of parabolic shape.

During the filter portion of an operating cycle, dust laden gases enter into the dust chamber 18 via inlet line 19, pass through the exposed external fabric surfaces of bags 20 and continue upwardly therein through the openings 35 within sound manifold 30 to exit via line 24 into the gas manifold 25. The solid dust particles are filtered from the gas, and prevented from entering into the interiors of the bags 20. Much of the dust accumulates on the bag surfaces and, sooner or later, the pores of the fabric become clogged. The dust must then be removed or dislodged from the bags 20 and thence removed from the installation, e.g., via an exit 27 as by use of a spiral screw type conveyor device 26 before further filtering action can take place.

To clean the filter bags 20, therefore, a complete operating cycle includes a cleaning segment, which follows the filtering segment of the cycle. Though various methods have been employed for cleaning the bags 20, sonic means have been found quite effective, alone or in combination with other methods, and the present invention, as stated, is concerned with means for making sonic cleaning systems more effective. Heretofore, sonic generators have been randomly placed or positioned within, e.g., an upper chamber located above the dust chamber 18. While this has proven effective, the present invention provides a marked improvement over such installations.

In said FIGURE 1 is thus shown a sound manifold 30 mounted above the dust chamber 18, though in a less preferred embodiment the sound manifold could be mounted within an upper clean gas chamber. In any event, more preferably, it includes a plurality of such sound manifolds located upon a single housing 10. A sound manifold 30 includes, e.g., a section of pipe, tubing or duct with closed ends. It also contains one or a plurality (of identical sound frequency) of sound generating means, e.g., horns or whistles 36, 37, preferably located near the closed ends of the manifold. Slide valves 38, 39 are provided so that a horn located within a sound manifold 30 can be changed without shut-down of that particular section of the installation, if desired. The sound waves produced by the sound generators 36, 37 are projected into the filter bags 20 via individual sound channels $35_1$, $35_2$, $35_3$ which are passed through the openings of top wall 13. The top of the manifold is provided with a valved outlet 24 for passage of clean gas to the gas manifold 25. Generally, an additional valved outlet 21 is provided for flowing reverse gas into the filter bags 20 to aid in purging. Such facility is particularly useful where the sound generators do not emit sufficient gas to aid in purging the bags 20.

An added feature of a sound manifold 30 is that a certain definite relationship exists between its length and the location therein of a given sound generating device. Thus, the manifold 30 can be of length so that the distance between a sound source, e.g. horn 36, 37, and the opposite end of the sound manifold 30 is a whole multiple of the wave length of the sound generated. The sound wave in accordance therewith will be reflected and amplified by the opposite closed end of the manifold to produce a standing wave. This is so whether a single horn 36 is employed or whether a second additional horn 37, or greater number of horns are employed. Thus, the reflected wave will travel in phase, in the opposite direction and in the same medium, with the propagated sound waves. As a result thereof, the energy level of the sound produced by any given sound generator will be far greater than in prior art generators. In prior art generators part of the reflected waves are out of phase with the propagated sound waves, as a result of which the total sound energy level is considerably lower and far less effective in the removal of collected dust from the bags.

Moreover, a profound advantage of the use of the sound manifold 30 is that higher intensity sound energy can be concentrated within the filter bags 20 from a given sound generator because the total volume of the sound manifold 30, i.e. the volume within which the sound energy is concentrated, can be made considerably less than the volume of the whole of a clean gas chamber as employed in prior art installations. The shape and geometry of the manifold 30 can also be fabricated to provide better and more intensive sound propagation.

Referring to FIGURE 2 there is shown a sectional view of the installation of FIGURE 1. The figure shows that a plurality of sound manifolds, of the type described, can be conveniently located within a single installation. Thus, there is shown an installation wherein a sound manifold 30, similar in all respects to that shown in FIGURE 1, is located above the dust chamber 18. Shown also are similar sound manifolds 30A, 30B which also are provided with a plurality of sound channels 35, e.g. $35_3A$, $35_3B$, to which individual filter bags 20 can be connected. In the installation represented by FIGURES 1 and 2, it will be observed that each of the sound channels 35 is located at a distance from the point source of sound (the mouth of the horn) which represents a whole number multiple of the sound wave produced. The same is true of the distance between the sound manifold exits 35 (also a point source of sound) and the plates 22 at the end of the filter bags 20.

During the cleaning portion of the operating cycle the bags 20 are subjected to intensive sonic vibrations produced by sound generators within the sound manifolds 20, 30A, 30B. Aerosols are deposited on the surfaces of the filter bags 20. Dust is removed from the outside surfaces of the bags 20 and falls or gravitates downwardly to the bottom of the enclosure where it is conveyed from the installation through outlet 27 via the screw conveyor 26.

A feature of this installation is that gas, air or steam released from the sound generators can also be utilized as reverse gas flow to aid the sound waves in removing dust from the bags 20. Where the sound generator does not provide sufficient gas for reverse gas flow, however, additional gas can be added at the desired time.

A sound manifold, or sound manifolds, can also be located outside an installation and the sound piped into the installation at the appropriate interval of time. Further, an externally located sound manifold can be used to pipe sound, as required, to a plurality of installations.

Referring to FIGURE 3, for example, is schematically shown a plan view of a preferred type of installation. A housing 10, generally the same as that shown in preceding figures, can constitute a dirty-gas chamber. Atop the housing is mounted a series of conduits or passageways A, B, C, D preferably of tubular shape. Each conduit is provided with tubular projections which are extended downwardly through openings through the top of the installation, and each projection is provided with a filter bag through which dirty gas is passed from the housing below into the conduits A, B, C, D.

A sound manifold 50, containing steam horns or whistles 51, 52 is communicated with the tubular members A, B, C, D by opening of the valves 53, 54, 55, 56. During the filtering portion of an operating cycle, e.g., a valve 53, 54, 55, 56 can be individually opened in timed sequence, while the others remain closed so as to provide maximum sound output and reverse gas flow into an installation at the given moment. Gases passing into the conduits A, B, C, D are removed therefrom by passage through the valves 63, 64, 65, 66 into the clean-gas header 60; and the valves 63, 64, 65, 66 can also be operated in timed sequence, as desired.

The length of the sound manifold 50, between a sound generating means 51 (and sound generating means 52) and the opposite closed end of the wall of the sound manifold may be constructed as a whole number multiple of the wave length of the sound generated. The lateral distance between the opening 73, 74, 75, 76 into a conduit A, B, C, or D and an end wall of sound chamber 50 may also be a whole number multiple of the wave lentgh of the sound produced, as also the distance between an opening 73, 74, 75, 76 (a point source of sound) and the valves 63, 64, 65, 66. A filter bag is also of length equal to a multiple of the wave length of sound produced. By use of this type installation, higher intensity sound energy can be directed into each installation while using relatively few sound generators. The sound manifold 50 amplifies the sound and the waves entering into each closed conduit A, B, C, D will be reflected. The reflected sound will have an additive effect so that the energy level in the bags will be increased.

It is apparent that the invention can be modified to some extent without departing the spirit and scope thereof.

Having described the invention, what is claimed is:

1. An apparatus for separating aerosols from gases comprising a housing with first enclosing walls defining a dust chamber, gas inlet means to said dust chamber for admitting aerosols, a plurality of rows of first outlet openings provided in at least one of said first walls, each said outlet opening having a partitioning filter bag operatively disposed thereover thus providing a plurality of rows of bags, separated aerosol discharge means in the lower portion of said dust chamber and operatively associated therewith for removal from the dust chamber of aerosols separated from the gases, a sound manifold for each row of bags, each sound manifold being provided with second enclosing walls and defining an elongated sound chamber, sound generating means located within said sound chamber and beaming sound waves along the length of said sound chamber, second openings in at least one of said second walls forming sound wave outlets for beaming sound waves therethrough and into the filter bags, there being at least one second opening for each said first opening in a given row, each said second opening fluidly communicating with a respective one of said first openings of a given row.

2. The apparatus of claim 1 wherein each sound manifold is provided with a reflecting end wall and is of a length providing a distance between the point source provided by the sound generating means and said reflecting end wall to create a standing sound wave at a given sound wave length.

3. The apparatus of claim 2 wherein the length of the sound manifold is sufficient to provide a distance between the point source of sound and said reflecting end wall equal to substantially a whole number multiple of said given sound wave length.

4. The apparatus of claim 2 wherein said second outlets are located at a distance from the point source of sound which corresponds to a whole number multiple of a given sound wave length.

5. The apparatus of claim 2 wherein said reflecting end wall is of parabolic shape.

6. An apparatus for separating aerosols from gases comprising a housing with first enclosing walls defining at least one dust chamber, gas inlet means to said dust chamber for admitting aerosols, a plurality of rows of first outlet openings provided in at least one of said first walls, each said outlet opening having a partitioning filter bag operatively disposed thereover thus providing a plurality of rows of filter bags, separated aerosol discharge means in the lower portion of said dust chamber and operatively associated therewith for removal from the dust chamber of aerosls separated from the gases, a sound manifold provided with second enclosing walls and defining a sound chamber, sound generating means located within said sound chamber and beaming sound waves therethrough, second openings in at least one of said second walls forming sound wave outlets, conduit means for each row of bags, each conduit means having third enclosing walls defining a passageway, third openings in said third walls, each third opening fluidly communicating with said one of said first openings, each said passageway fluidly communicating with the sound manifold through one of said second openings for transmitting sound waves from said sound manifold into said filter bags, said passageways further communicating with a clean gas outlet.

7. The apparatus of claim 6 wherein valve means are provided for selectively isolating said passageways to operate sequentially as a clean gas discharge conduit and a sound manifold.

8. The apparatus of claim 6 wherein the sound manifold is provided with a reflecting end wall and is of a length providing a distance between the point source provided by the sound generating means and said reflecting end wall to create a standing sound wave at a given sound wave length.

9. The apparatus of claim 8 wherein the length of the sound manifold is sufficient to provide a distance between the point source of sound and said reflecting end wall equal to substantially a whole number multiple of said given sound wave length.

10. The apparatus of claim 8 wherein said second opening is located at a distance from the point source of sound which corresponds to a whole number multiple of said given sound wave length.

11. The apparatus of claim 8 wherein said reflecting end wall of the sound manifold is of parabolic shape.

12. The apparatus of claim 8 wherein the distance between said second opening and a terminal end of a filter bag is equal to a whole number multiple of a given sound wave length.

References Cited

UNITED STATES PATENTS

| | | | |
|---|---|---|---|
| Re. 24,521 | 8/1958 | Young | 55—293 X |
| 2,300,761 | 11/1942 | Amy | 55—15 |
| 2,526,651 | 10/1950 | Garbo | 55—303 X |
| 2,769,506 | 11/1956 | Abboud | 55—379 X |
| 2,836,256 | 5/1958 | Gaskey | 55—349 X |
| 2,962,120 | 11/1960 | Lagaris | 55—292 |
| 3,053,031 | 9/1962 | Vedder et al. | 55—292 |
| 3,157,153 | 11/1964 | Moe | 55—15 |
| 3,158,455 | 11/1964 | Lincoln | 55—341 X |

FOREIGN PATENTS

| | | |
|---|---|---|
| 460,795 | 2/1937 | Great Britain. |
| 651,356 | 3/1951 | Great Britain. |
| 951,780 | 3/1964 | Great Britain. |
| 336,385 | 2/1936 | Italy. |

OTHER REFERENCES

Boucher, R. M. G.: "Ultrasonics in Processing," Chemical Engineering, Oct. 2, 1961, pp. 95 and 96 (copy in Group 177, class 55, subclass 15).

HARRY B. THORNTON, *Primary Examiner.*

DENNIS E. TALBERT, JR., *Assistant Examiner.*